E. BARNES.
STRAIGHT SIDE SPECTACLES AND THE LIKE.
APPLICATION FILED JUNE 22, 1908.

959,105.

Patented May 24, 1910.

Witnesses
M. W. Darg.
H. K. Boulter

Inventor
Edwin Barnes,
By Wm. E. Boulter,
Attorney

UNITED STATES PATENT OFFICE.

EDWIN BARNES, OF SHEFFIELD, ENGLAND.

STRAIGHT-SIDE SPECTACLES AND THE LIKE.

959,105.     Specification of Letters Patent.     Patented May 24, 1910.

Original application filed August 13, 1906, Serial No. 330,492. Divided and this application filed June 22, 1908. Serial No. 439,798.

*To all whom it may concern:*

Be it known that I, EDWIN BARNES, a subject of the King of England, residing at Sheffield, Yorkshire, in England, have invented certain new and useful Improvements in or Relating to Straight-Side Spectacles and the Like.

This invention is a division of my former case Ser. No. 330492 and relates to straight or spring side spectacles and the like its object being to provide a particular form of the straight or spring side described and claimed in my former specification aforesaid.

Figure 1:
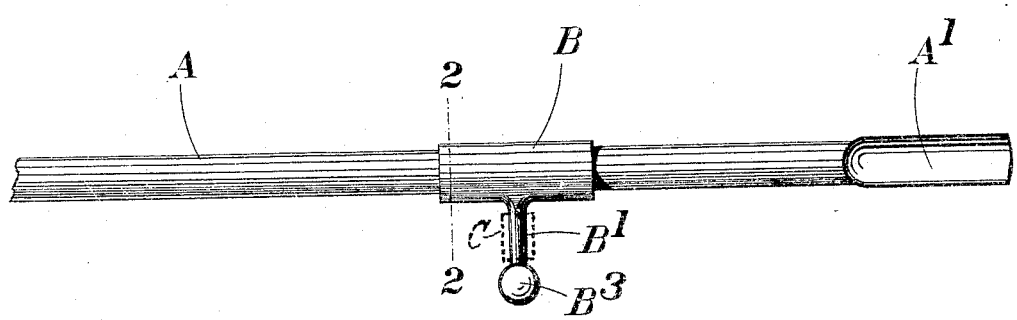
Figure 2:
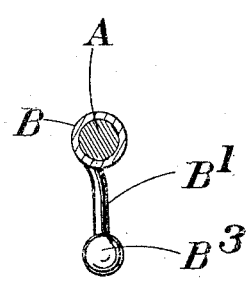
Figure 3:
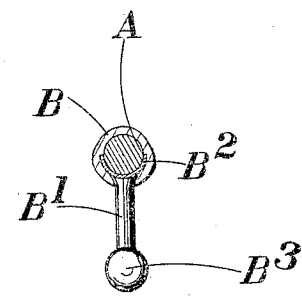
Figure 4:
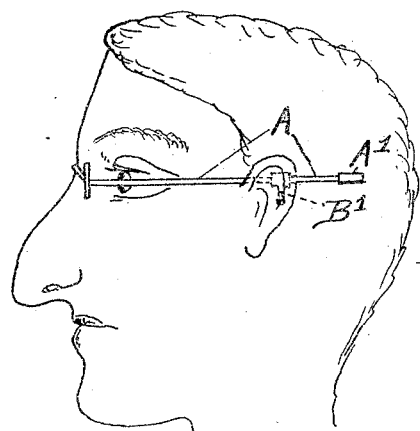

In the accompanying drawings:—Figure 1 is an enlarged elevation of a spectacle side according to the present invention. Fig. 2 is a section on the line 2—2 of Fig. 1 and Fig. 3 is a view similar to Fig. 2 showing a modification. Fig. 4 is a view illustrating a pair of spectacles according to this invention *in situ* on the head of a wearer.

Like letters indicate like parts throughout the drawings.

In carrying out this invention the spectacle side A is made more or less straight, with the requisite amount of spring in it $A^1$ being its free end. The hinge and the remainder of the frame form no part of the present invention and are not illustrated in Figs. 1, 2 and 3. A sleeve B is placed around the side A and carries a projection $B^1$, or the projection $B^1$ and sleeve B may be made in separate parts as shown in Fig. 3. In the latter case a flange or the like $B^2$ is made at one end of the projection $B^1$ the sleeve B embracing it and thus clamping the projection $B^1$ to the side A.

The shape of the projection $B^1$ may vary as desired although it is preferred to make its free end somewhat rounded as shown at $B^3$. A pad in the form of tube or the like of rubber or similar material may be placed on the projection $B^1$ and its rounded end $B^3$ may also be covered if desired. Such a pad is indicated in dotted lines at C in Fig. 1. The sleeve B may either be firmly secured to the side A or may be movable thereon, so that the position of the projection $B^1$ is adjustable. In either case the projection is designed to be rigid.

The projection $B^1$ is so situated upon the straight side A that when the spectacles to which this invention is applied are in use it is situated behind the ear of the wearer, between the ear and the free end of the side.

Fig. 4 illustrates the invention in use. The projection $B^1$ is situated behind the ear of the wearer and prevents the spectacles from slipping forward. An increased bearing surface is also provided by the use of the projection $B^1$, for the spectacle side extends beyond it as far as $A^1$ and the whole of this extension as well as the projection $B^1$ is pressed against the head by the pressure exerted by the spring side, A, thereby securely holding the spectacles in place. By making the sleeve B movable the exact position of the projection may be varied to suit individual requirements.

What I claim and desire to secure by Letters Patent is:—

1. The combination of a spectacle spring side, a sleeve thereon adapted to be situated behind the ear of the wearer between the ear and the free end of the side, a projection on the sleeve, both the projection and the free end of the side being pressed into contact with the wearer's head by the pressure exerted by the spring side substantially as and for the purpose set forth.

2. The combination of a spectacle spring side, a projection, a flange on the projection and a sleeve on the spectacle side behind the ear of the wearer between the ear and the end of the side embracing the flange substantially as and for the purpose set forth.

3. The combination of a spectacle spring side, a projection, a flange on the projection a sleeve on the spectacle side behind the ear of the wearer between the ear and the end of the side embracing the flange and a pad on a projection substantially as and for the purpose set forth.

In testimony whereof I have signed my name to this specification in the presence of two subscribing witnesses.

EDWIN BARNES.

Witnesses:
   CHAS. N. DANIELS,
   ARTHUR L. GREENWOOD.